United States Patent [19]
Ziech

[11] Patent Number: 5,673,777
[45] Date of Patent: Oct. 7, 1997

[54] DIFFERENTIAL LOCK ASSEMBLY SPACER SYSTEM

[75] Inventor: James F. Ziech, Kalamazoo, Mich.

[73] Assignee: Eaton Corporation, Cleveland, Ohio

[21] Appl. No.: 514,319

[22] Filed: Aug. 11, 1995

[51] Int. Cl.⁶ ............................................. F16H 48/24
[52] U.S. Cl. ............................ 192/109 R; 192/69.8; 192/108; 475/237
[58] Field of Search ................... 192/109 R, 108, 192/69, 69.8, 110 R; 74/339; 475/237, 250

[56] References Cited

U.S. PATENT DOCUMENTS

| | | | |
|---|---|---|---|
| 3,000,456 | 9/1961 | Christe | 180/22 |
| 3,368,638 | 2/1968 | Terry et al. | 180/22 |
| 3,388,760 | 6/1968 | Christe | 180/22 |
| 4,263,824 | 4/1981 | Mueller | 74/711 |
| 4,432,431 | 2/1984 | Russell | 180/248 |
| 5,176,235 | 1/1993 | Williams | 192/109 R |

*Primary Examiner*—Andrea L. Pitts
*Attorney, Agent, or Firm*—Brooks & Kushman PC

[57] ABSTRACT

A spacer system for a differential lock assembly having a fixed clutch and a sliding clutch with a sliding-clutch collar. The spacer system comprises a shift fork member and a bearing adjuster which contact when the sliding clutch and fixed clutch are engaged so as to prevent the shift fork member from binding within the sliding-clutch collar, without requiring a manual adjustment to account for tolerance stackups or gear or bearing positional adjustments.

3 Claims, 5 Drawing Sheets

DIFFERENTIAL LOCK ASSEMBLY SPACER SYSTEM

TECHNICAL FIELD

This invention relates to a differential lock assembly spacer system, and more particularly, to a differential lock assembly in which a shift fork need not be adjusted after assembly of the differential lock assembly to prevent the shift fork from binding within a sliding clutch collar of a sliding clutch when the sliding clutch is engaged to a fixed clutch.

BACKGROUND ART

Multiple drive axle assemblies, such as tandem axles, having interaxle differentials, also called power dividers, with selectively engaged interaxle and wheel differential lockups, and the mechanisms and controls for selectively locking said differentials, are well known in the prior art as may be seen by reference to U.S. Pat. Nos. 3,000,456 and 3,388,760, the disclosures of which are hereby incorporated by reference in their entirety.

Multi-speed tandem axles having lockable interaxle differentials with separate controls for selectively shifting the axles and engaging the interaxle differential, and controls for limiting shifting of the axles in response to sensing engagement of the interaxle differential lockup are known in the prior art as may be seen by reference to U.S. Pat. No. 3,368,638, the disclosure of which is hereby incorporated by reference in its entirety.

As may be seen by reference to U.S. Pat. No. 4,432,431, also hereby incorporated by reference in its entirety, differential lock assemblies typically include a push or a piston rod member slidably mounted within a shift cylinder. A shift fork member is fixedly connected to the piston rod member in a substantially perpendicular relationship. The shift fork member rotatably engages a slidable clutch member which has a splined bore. The splined bore of the slidable clutch member slidably engages a splined shaft member. The piston member is biased by a spring such that the sliding clutch is disengaged from a fixed clutch. When the piston member is biased by the spring to a position where the sliding clutch is disengaged from the fixed clutch, the differential is rendered operable. However, upon pressure being delivered to the shift cylinder, the piston rod, and correspondingly the shift fork and sliding clutch, will be moved such that the sliding clutch is lockably engaged with the fixed clutch thereby locking out the differential.

Of course, as set forth in U.S. Pat. No. 4,432,431, a reverse bias system may also be provided in which the piston rod is spring biased such that the sliding clutch is in locking engagement with the fixed clutch. In such a system, the sliding clutch would be displaced from locking engagement with the fixed clutch by the application of pressure to the shift cylinder.

While other components may and generally do comprise a complete differential lockup system, such parts, a number of which are described in U.S. Pat. No. 4,432,431, are well known in the art and will not be described in further detail here.

Differential lock systems typically provide some sort of adjustment to ensure that the shift fork is not binding or continuously rubbing against the sliding clutch when the sliding clutch is in the engaged position with the fixed clutch. Such adjustments are necessary to account for tolerance stackups which occur during assembly between the parts incorporated within the differential lock system. Adjustments are also necessary to account for the differential bearing preload and to set the backlash in a bevel gear set.

For example, the shift fork may be connected to the piston rod via a clinch bolt. This allows the shift fork to be adjusted axially along the piston rod before being fixedly connected via the clinch bolt. Thus, after the differential lock system has been assembled, and in order to account for tolerance stackups and bearing or gear settings, a feeler gauge may be placed between the sliding clutch and the fixed clutch in a disengaged position and the clutch bolt tightened to fixedly connect the shift fork to the piston rod in the correct axial position.

Alternatively, the piston member may include a threaded portion which may be threadably engaged to a threaded sleeve having limited axial movement within the shift cylinder. The shift fork is adjusted axially along the piston rod by rotating the piston rod such that the threaded portion of the piston rod engages the threaded sleeve thereby moving the piston rod axially in the direction desired. The piston rod can then be locked into place axially via a jam lock set screw.

Because such ways of adjusting the axial position of the shift fork are well known in the art, will not be described in further detail here. The problem with such typical adjustment systems is that they require the shift fork to be adjusted after the differential lock system has been assembled.

SUMMARY OF THE INVENTION

An object of the present invention is to provide an improved differential lock assembly which does not require a shift fork to be adjusted axially along a piston rod member, after the differential lock system has been assembled, in order to prevent the shift fork from binding or rubbing against a sliding clutch when in the engaged position.

In carrying out the above objects, features, and advantages, the present invention provides a spacer system for a differential lock assembly having a fixed clutch and a sliding clutch, the sliding clutch having a sliding clutch collar. The spacer system comprises a shift fork member and a bearing adjuster which contact when the sliding clutch and fixed clutch are engaged so as to prevent the shift fork member from binding within the sliding clutch collar.

In a preferred embodiment, the shift fork member comprises a fork body having a fork stop which, when the sliding clutch and fixed clutch are engaged, will contact the bearing adjuster so as to prevent the shift fork member from binding within the sliding clutch collar. In an alternative preferred embodiment, the bearing adjuster has a bearing adjuster body having a bearing adjuster stop which, when the sliding clutch and fixed clutch are engaged, will contact the shift fork member so as to prevent the shift fork member from binding within the sliding clutch collar.

In another alternative embodiment, the shift fork member has a shift fork stop and the bearing adjuster has a bearing adjuster stop and the shift fork stop and bearing adjuster stop contact when the sliding clutch and fixed clutch are engaged so as to prevent the shift fork member from binding within the sliding clutch collar.

Another object of this invention is to provide a method for assembling a differential lock assembly having a piston rod member, a shift fork member, a fixed clutch, a bearing adjuster, and a sliding clutch with a sliding clutch collar. The method comprises connecting the shift fork member to the piston rod member and incorporating the bearing adjuster into the differential lock assembly such that the bearing adjuster will contact the shift fork member when the sliding clutch and fixed clutch are engaged so as to, without subsequent axial adjustment of the shift fork member along the piston rod member, prevent the shift fork member from binding within the sliding clutch collar.

An advantage of this invention is that no axial adjustment of the shift fork member is required after the differential lock assembly has been assembled to prevent the shift fork member from binding within the sliding clutch collar.

Further objects and advantages of this invention will be apparent from the following description, reference being had to the accompanying drawings wherein preferred embodiments of the present invention are clearly shown.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

BEST MODE FOR CARRYING OUT THE INVENTION

Figure 1:
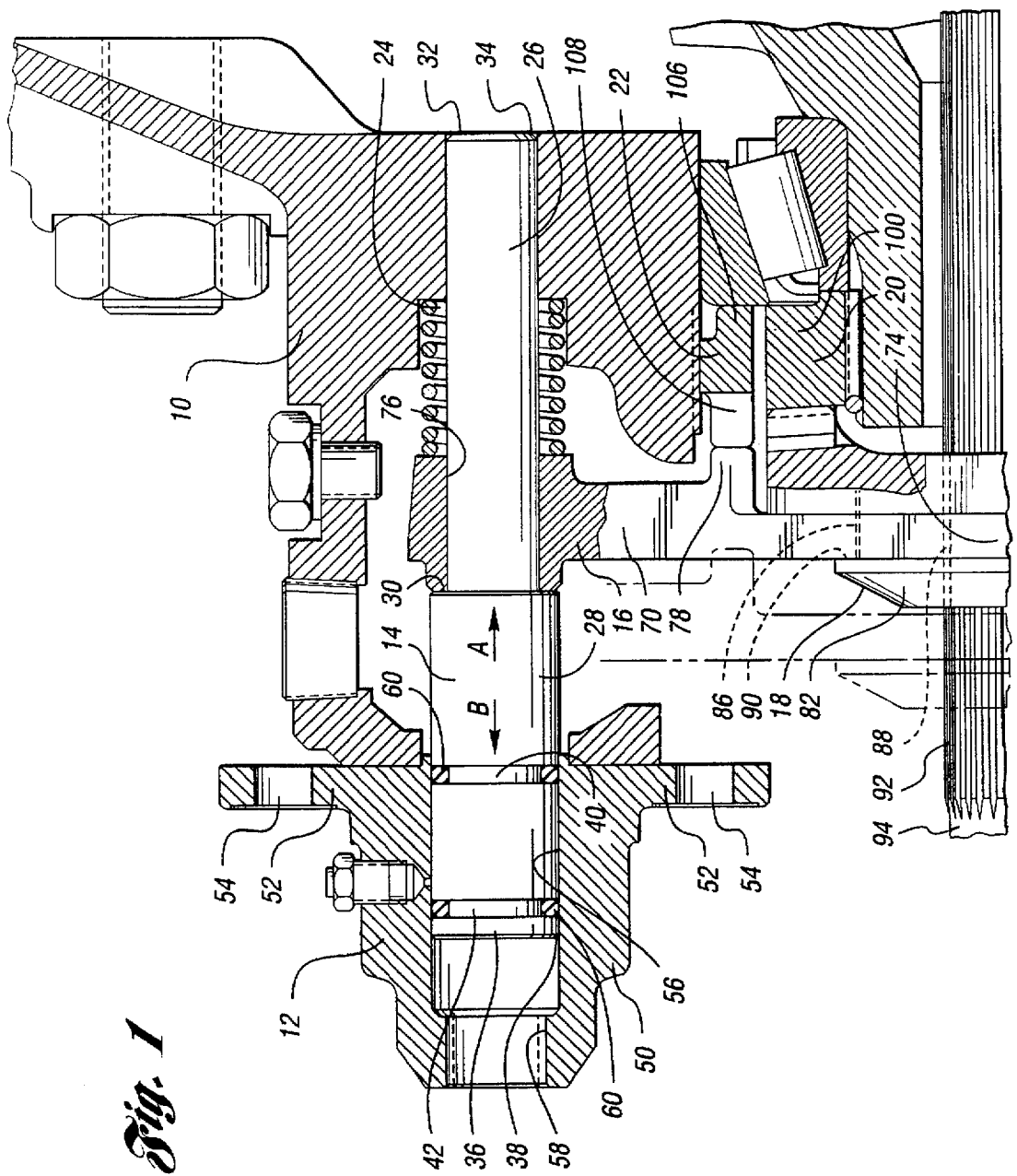
FIG. 1 is a sectional view of a differential lock assembly showing one embodiment of this invention.
Figure 2:
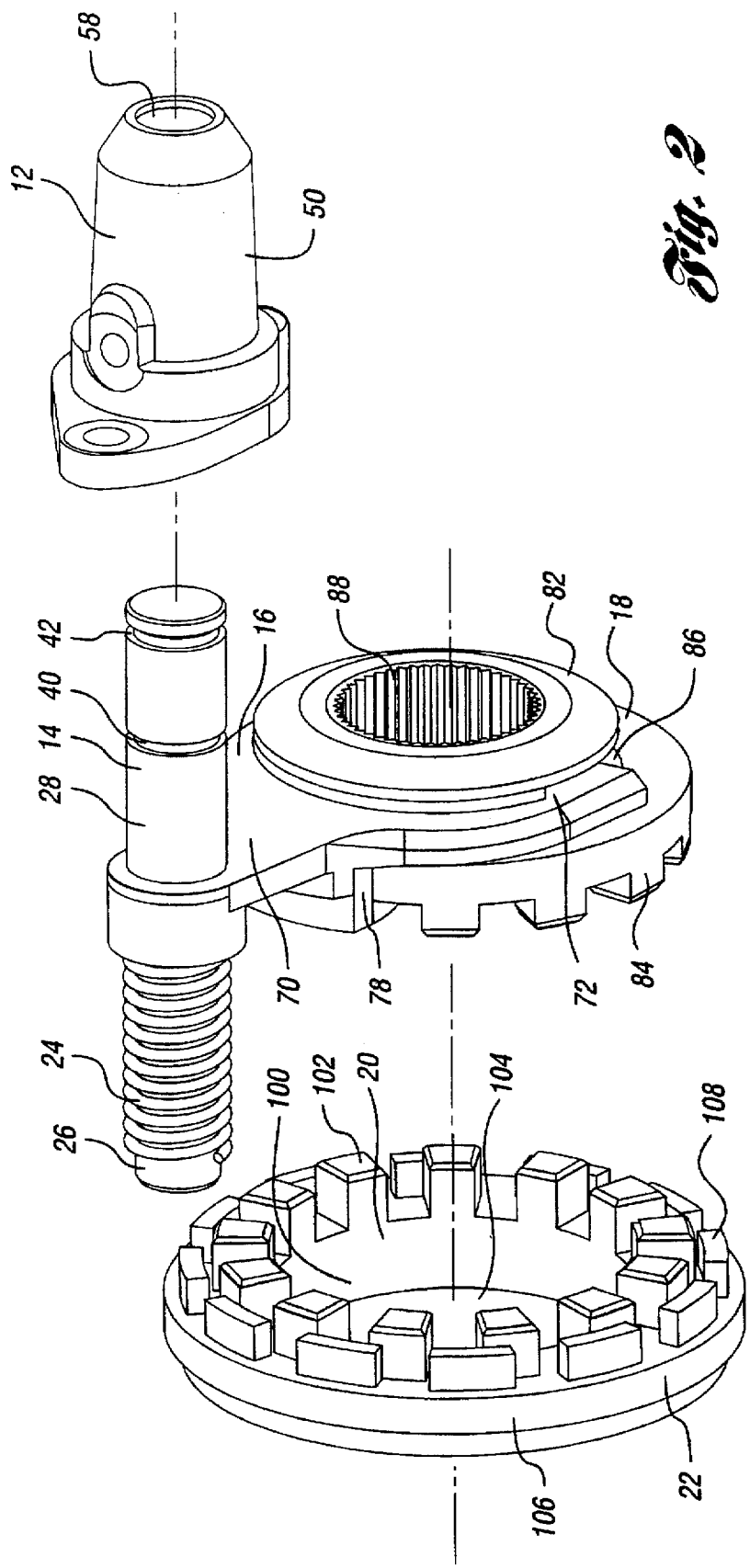
FIG. 2 is an exploded view showing the primary components of the differential lock assembly shown in FIG. 1.

A differential lock assembly incorporating one embodiment of this invention is shown in FIGS. 1 and 2. The primary components of the differential lock assembly include a differential housing 10, a shift cylinder 12, a piston rod member 14, a shift fork member 16, a sliding clutch 18, a fixed clutch 20, a bearing adjuster 22, and a spring member 24.

As shown in FIGS. 1 and 2, the piston rod member 14 has a small cylindrical portion 26 and a large cylindrical portion 28 which are joined at a rod member shoulder 30. The small cylindrical portion 26 defines a return end 32 which preferably has a chamfer 34. The large cylindrical portion 28 defines a pressurized end 36 also having a chamfer 38. The large cylindrical portion 28 also defines two annular grooves 40 and 42. Because such piston rod members are well known in the art, the piston rod member 14 will not be described in further detail here.

The shift cylinder 12 has a cylinder body 50 which defines a cylinder flange 52 having fastener bores 54. The cylindrical body 50 also defines rod member bore 56 and a hydraulic bore 58. The hydraulic bore 58 is designed to receive a hydraulic line (not shown) for providing pressurized hydraulic fluid to the hydraulic bore 58 and rod member bore 56. Of course, pneumatic pressure or another equivalent form of actuation may be utilized without departing from the spirit or scope of the present invention. As shown in FIG. 1, the shift cylinder 12 is connected, by using bolts or any other suitable fasteners, to the differential housing 10 via the fastener bores 54 such that the rod member bore 56 is in communication with the interior of the differential housing 10.

As can be seen in FIG. 1, rod member bore 56 is designed to slidably receive the large cylindrical portion 28 of the piston rod member 14. O-rings 60, made of any suitable material, are placed in the annular grooves 40 and 42 of the large cylindrical portion 28 of the piston rod member 14 in order to ensure a sealed fit within the rod member bore 56. Such shift cylinders are well known in the art, and will not be described in further detail here.

The shift fork member 16 has a fork body 70 which defines fork prongs 72 and 74. The fork body 70 defines a fork bore 76. The fork bore 76 is designed to receive the small cylinder portion 26 of the piston rod member 14 and abut the shoulder 30 of the piston rod member 14 as shown in FIG. 2. The shift fork member 16 can then be fixedly connected on the piston rod member 14 using any suitable connection. On the embodiment shown, the connection is made via the spring member 24 trapping the fork 16 against the piston rod member shoulder 30. Such shift forks are well known in the art and will not be described in further detail here. However, for the purpose of this embodiment of the invention, the shift fork member 16 includes a fork stop 78 which, in the embodiment shown, comprises a lateral projection protruding from the fork body 70.

The sliding clutch 18 has an annular body 82 which defines sliding clutch teeth 84, a sliding clutch collar which in this embodiment comprises an annular collar groove 86, and a splined sliding clutch bore 88. The annular collar groove 86, which has collar groove sides 90, is designed to receive the fork prongs 72 and 74 of the shift fork member 16 such that the sliding clutch 18 is free to rotate. The splined bore 88 of the sliding clutch 18 is designed to slidably engage the splined portion 92 of a shaft member 94 which typically is provided with a suitable joint or a universal coupling (not shown) for connection with a propeller shaft or the like (not shown) to deliver torque input into the differential lock assembly 10. Such sliding clutches are well known in the art and will not be described in further detail here.

The fixed clutch 20 has an annular body 100 defining fixed clutch teeth 102 and a fixed clutch bore 104. Situated around the perimeter of the fixed clutch 20 is a bearing adjuster 22 having an annular bearing adjuster body 106. The annular bearing adjuster body 106 defines adjuster projections 108 which can normally be engaged by a tool, such as a screwdriver, in order to revolve and adjust the bearing adjuster 22. Because such fixed clutches and bearing adjusters are well known in the art, they will not be described in further detail here.

The fixed clutch bore 104 is designed to engage a shaft member 94 for transmitting the input torque from the differential lock assembly to a drive pinion (not shown).

As shown in this embodiment, the spring member 24 comprises a helical-type spring made from spring steel which encircles the small cylindrical portion 26 of the piston rod member 14 and exerts a separating force between the shoulder 30 and a spring seat 112 of the differential housing 10. Because such spring members are well known in the art, they will not be described in further detail here.

Operation of the differential lock assembly according to the present invention is relatively simple. After the differential lock assembly has been assembled, fluid pressure may be delivered to the shift cylinder 12, thereby causing movement of the piston rod member 14 in the direction "A" as shown in FIG. 1. The shift fork member 16 and sliding clutch 18 will be correspondingly moved in the same direction until the fork stop 78 contacts the adjuster projections 108 of the bearing adjuster 22. The shift fork stop 78 is dimensioned such that the sliding clutch teeth 84 will then fully engage the fixed clutch teeth 102 thereby locking the differential. The shift fork stop 78 is also dimensioned to prevent the shift fork member 16 from being in a position during such locked condition so as to allow the fork prongs 72 and 74 to bind or rub against the collar groove sides 90 of the annular collar groove 86. Thus, no axial adjustment of the shift fork member 16 along the piston rod member 14 is required after the differential lock assembly has been assembled within the differential housing 10 to prevent such binding which might otherwise normally occur.

As indicated on FIG. 2, when the fluid pressure being delivered to the shift cylinder 12 is released, the spring member 24, which was compressed during pressurization, will then force the piston rod member 14 to move in the direction "B" thereby disengaging the sliding clutch teeth 84 from the fixed clutch teeth 102 which correspondingly unlocks the differential lock assembly.

Figure 3:
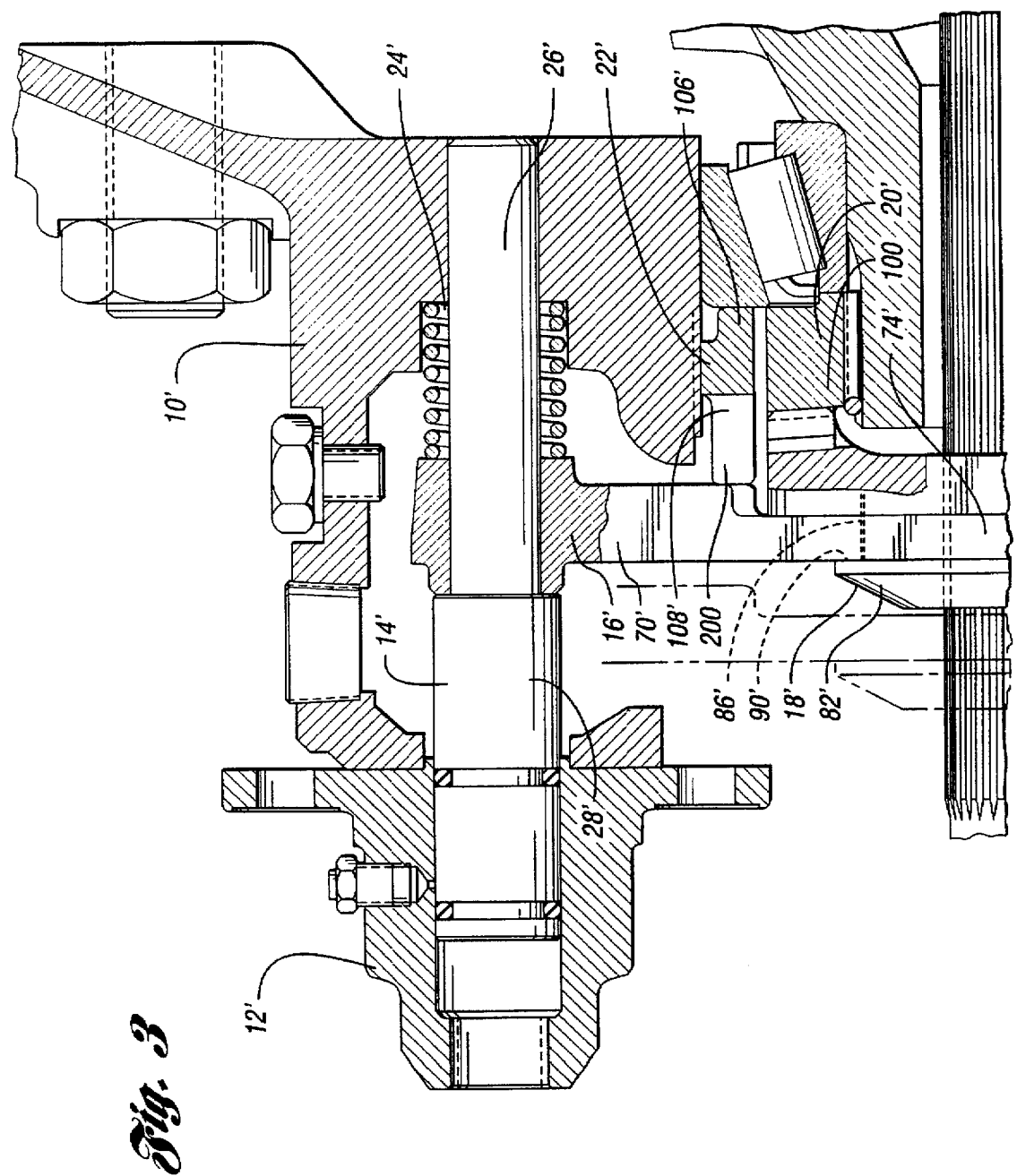
FIG. 3 is a sectional view of a differential lock assembly showing a second embodiment of this invention.

An alternative embodiment of this invention shown in FIG. 3 which is a sectional view similar to FIG. 1. This embodiment is very similar to the differential lock assembly shown in FIGS. 1 and 2. Accordingly, the same components have been referenced using primed reference characters (i.e. 108'). The significant difference is that the shift fork 16' does not include a fork stop projection while the dimension of the adjuster projections 108' have been increased to form bearing adjuster stops 200 at the end of the adjuster projections 108' so as to provide the same relative spacing between the shift fork member 16' and the bearing adjuster 22' as was provided in the embodiment shown in FIGS. 1 and 2 when the differential lock assembly is in a locked position.

Figure 4:
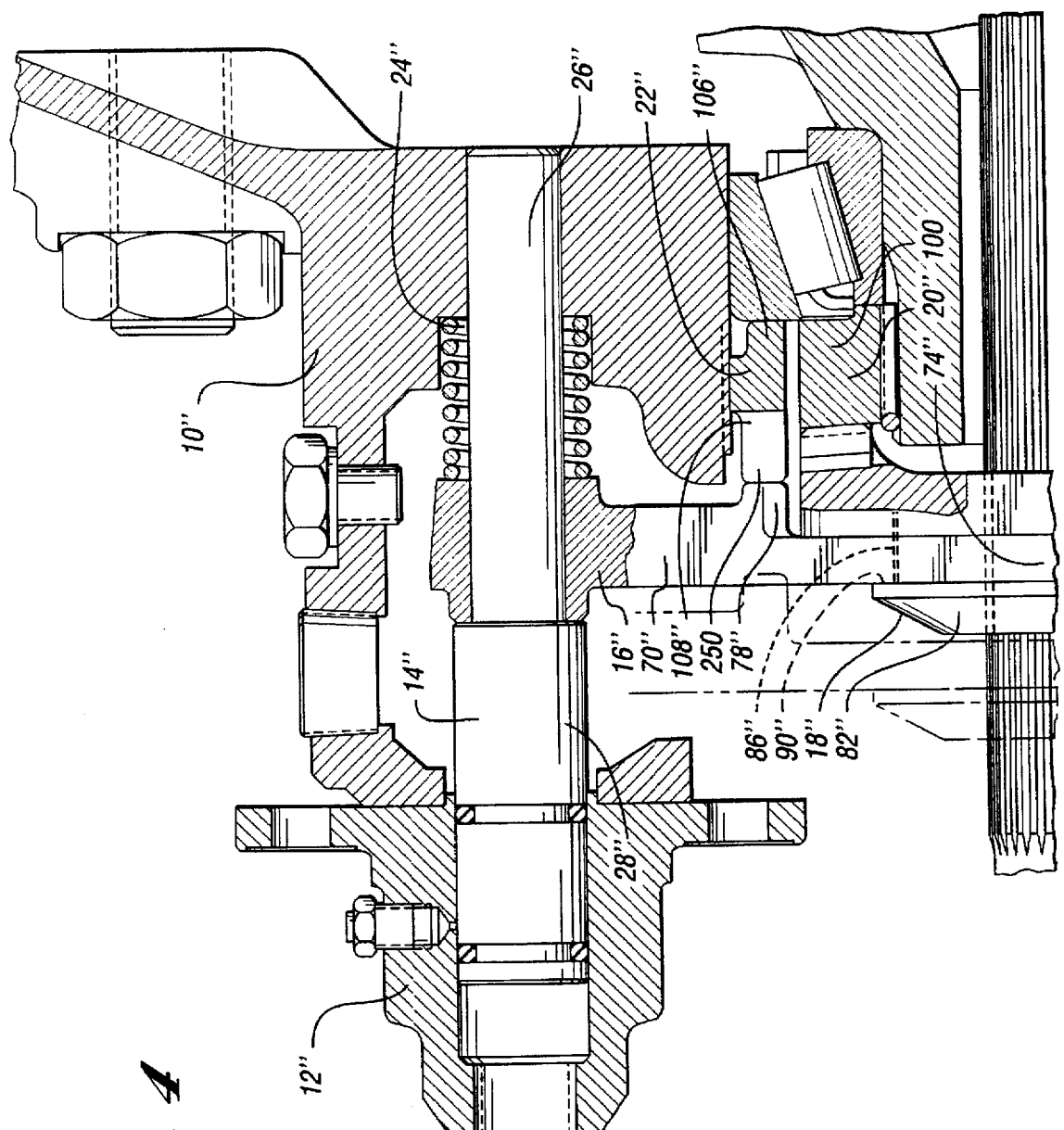
FIG. 4 is a sectional view of a differential lock assembly showing a third embodiment of this invention.

A third alternative embodiment of this invention is shown in FIG. 4 which is a sectional view similar to FIG. 1. This embodiment is also very similar to the differential lock assembly shown in FIGS. 1 and 2. Accordingly, the same components have been referenced using double-primed reference characters (i.e. 108"). The difference here is that the bearing adjuster projections 108" have been lengthened to form bearing adjuster stops 250 while the fork stop 78" has been shortened so as to provide the same relative spacing between the shift fork member 16" and the bearing adjuster 22" as was provided in the embodiment shown in FIGS. 1 and 2 when the differential lock assembly is in a locked position.

Figure 5:
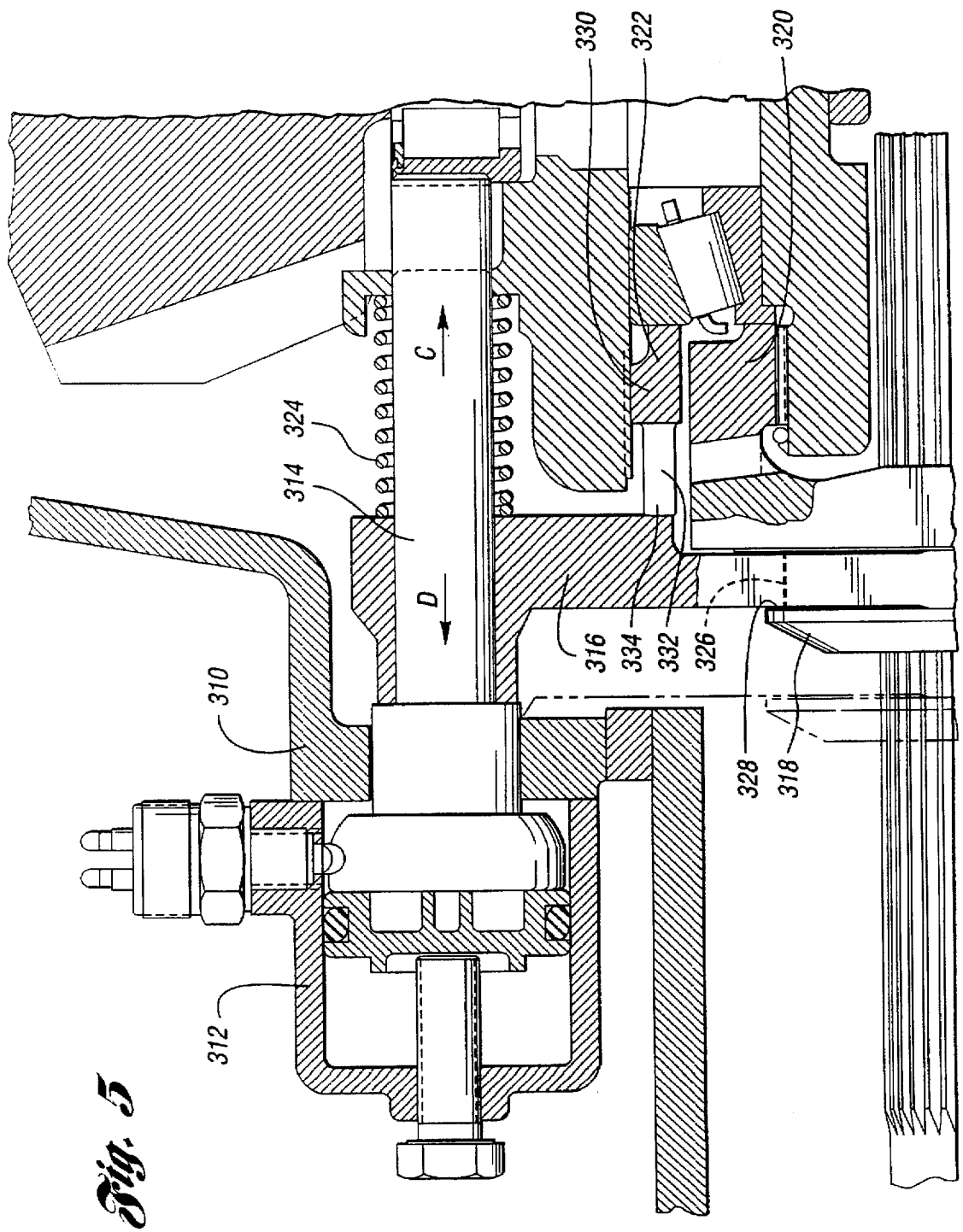
FIG. 5 is a sectional view of a differential lock assembly showing a fourth embodiment of this invention.

Another alternative embodiment of this invention is shown in FIG. 5 which is a sectional view again similar to FIG. 2. This embodiment is similar to the differential lock assembly shown in FIGS. 1 and 2 except that this embodiment is a pneumatically operated design while the embodiment shown in FIGS. 1 and 2 is a hydraulically operated design. The primary components of the differential lock assembly shown in FIG. 4 include a differential housing 310, an air activated shift cylinder 312, a piston rod member 314, a shift fork member 316, a sliding clutch 318, a fixed clutch 320, a bearing adjuster 322, and a spring member 324.

Similar to the embodiment shown in FIGS. 1 and 2, the sliding clutch 318 has a sliding clutch collar comprising an annular collar groove 326 which has collar groove sides 328.

Because these components of a pneumatically operated differential lock assembly are well known in the art, they will not be described in further detail here. However, for the purpose of this embodiment of the invention, the bearing adjuster 322 has an annular bearing adjuster body 330 which defines adjuster projections 332 which have been lengthened to form bearing adjuster stops 334 spaced along the annular bearing adjuster body 330.

Operation of this embodiment of a differential lock assembly according to the present invention is relatively simple. After the differential lock assembly has been assembled, air pressure may be delivered to the air activated shift cylinder 312 thereby causing movement of the piston rod member 314 in the direction "C" as shown in FIG. 5. As with hydraulic pressure activation, this pressure activation may be manually controlled by the vehicle operator, such as via a dashboard switch. Alternatively, the activation may be automatically controlled by the vehicle control module, engine control module, or the like. The shift fork member 316 and sliding clutch 318 will be correspondingly moved in the same direction until the bearing adjuster stops 334 contact the shift fork member 316. The bearing adjuster stops 334 are dimensioned such that the sliding clutch 318 will engage the fixed clutch 320 thereby locking the differential. The bearing adjuster stops 334 are also dimensioned to prevent the shift fork member 316 from binding or rubbing against the collar groove sides 328 of the annual collar groove 326. Thus, no axial adjustment of the shift fork member 316 along the piston rod member 314 is required after the differential lock assembly has been assembled within the differential housing 310.

When the air pressure being delivered to the air activated shift cylinder 312 is released, the spring member 324, which was compressed during pressurization, will then force the piston rod member 314 to move in the direction "D" thereby disengaging the sliding clutch 318 from the fixed clutch 320 which correspondingly unlocks the differential lock assembly.

Of course, the shift fork stops and bearing adjuster stops in all of the embodiments described may also be used in a reverse bias differential lock assembly in which the piston rod member is spring biased by the spring member such that the sliding clutch is in locking engagement with the fixed clutch. In such a system, the sliding clutch would be displaced from locking engagement with the fixed clutch by the application of hydraulic or air pressure to the shift cylinder. Similarly, the present invention may be utilized in applications having a single drive axle so that left-side and right-side wheels are driven synchronously in addition to interaxle applications where more than one drive axle is driven synchronously.

While particular embodiments of the invention have been illustrated and described, it will be obvious to those skilled in the art that various changes and modifications may be made without departing from this invention. It is intended that the following claims cover all such modifications and all equivalents that fall within the spirit of this invention.

What is claimed is:

1. A spacer assembly comprising:

a differential lock assembly having a fixed clutch and a sliding clutch, the sliding clutch having a sliding-clutch collar; and a shift fork member and bearing adjuster which contact one another when the sliding clutch and fixed clutch are engaged so as to prevent the shift fork member from binding within the sliding-clutch collar.

2. The spacer assembly of claim 1 wherein the sliding-clutch collar is an annular collar groove having collar groove sides spaced such that the shift fork member will not bind within the annular collar groove when the sliding clutch and fixed clutch are engaged.

3. The spacer assembly of claim 2 wherein the shift fork member has a shift fork stop and the bearing adjuster as a bearing adjuster stop and wherein the shift fork stop and the bearing adjuster stop contact one another when the sliding clutch and fixed clutch are engaged.

* * * * *